July 24, 1962     H. E. MARTIN     3,046,450
SPEED RESPONSIVE FUEL CONTROL FOR HELICOPTERS
Filed July 9, 1959                               2 Sheets-Sheet 1
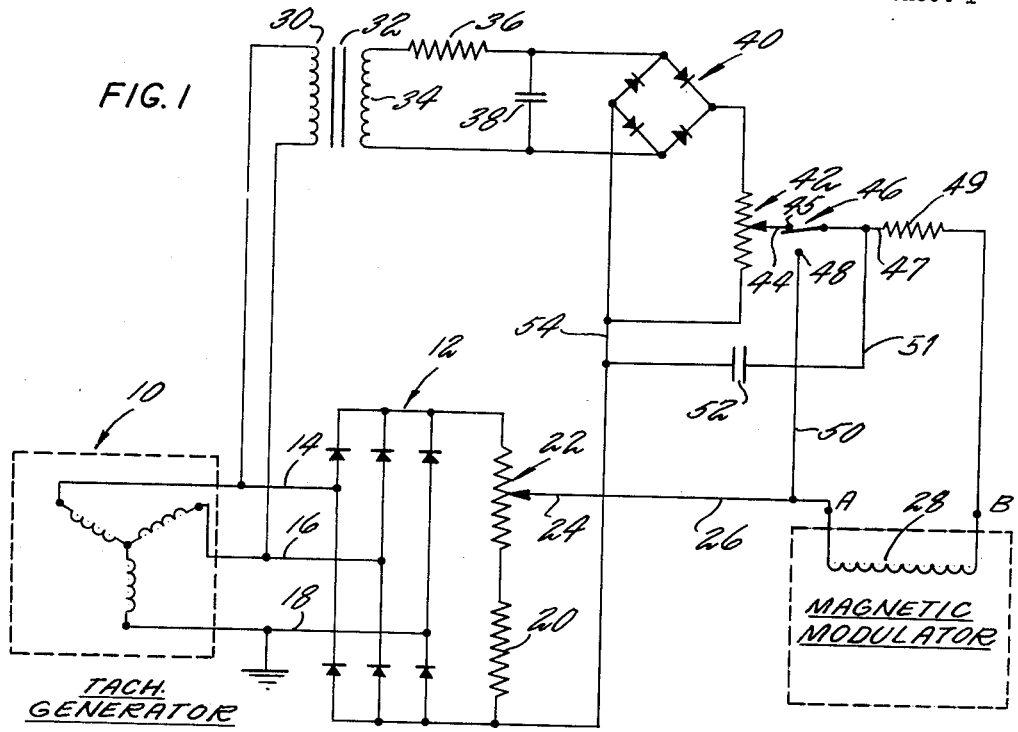
INVENTOR
HENRY E. MARTIN
BY *Harris G. Luther*
ATTORNEY July 24, 1962 H. E. MARTIN 3,046,450
SPEED RESPONSIVE FUEL CONTROL FOR HELICOPTERS
Filed July 9, 1959 2 Sheets-Sheet 2

INVENTOR
HENRY E. MARTIN
BY Harris G. Lucher
ATTORNEY

United States Patent Office 3,046,450
Patented July 24, 1962

3,046,450
SPEED RESPONSIVE FUEL CONTROL
FOR HELICOPTERS
Henry E. Martin, Wapping, Conn., assignor to United
Aircraft Corporation, East Hartford, Conn., a corporation of Delaware
Filed July 9, 1959, Ser. No. 825,988
8 Claims. (Cl. 317—5)

This invention relates to an electronic governing circuit for controlling a variable of operation of a device, and particularly to a circuit in which the variable of operation is sensed and compared to a datum for producing an error signal. Means are provided to allow selective switching between a governing condition of operation and a standby condition of operation, and a further novel feature is the incorporation of means to prevent an undesirable instantaneous buildup in the error signal when switching from standby to governing operation.

This invention will be described in association with a fuel control for a turbine engine in which speed is the variable of operation being controlled by regulating the flow of fuel to the engine, but it is understood that the invention need not be limited to such an application and is adaptable for use in situations in which governing control over a variable of operation is desired.

It is an object of this invention to provide an electronic control for a variable of operation of a device.

Another object of this invention is to provide an electronic circuit for producing an error signal indicative of the deviation of a variable of operation from preselected value.

A further object of this invention is to provide an electronic governing control circuit which can be selectively switched to governing or standby operation and which will temporarily attenuate the magnitude of any error signal which results when switching from standby to governing operation.

Another object of this invention is to provide a control circuit in which a variable of operation is compared with a datum to produce an error signal and in which a change in the datum will be delayed in taking effect upon the error signal.

A still further object of this invention is an electronic speed control for a turbine engine which will vary the fuel flow to the engine for regulating the engine speed in response to the deviation of said speed from a preselected value.

These and other objects and a fuller understanding of the invention may be had by referring to the following description and claims, taken in conjunction with the accompanying drawings in which:

FIG. 1 is a schematic representation of the electronic control circuit;

FIG. 2 is a graphical description of the operating characteristics of the control circuit.

Figure 3:
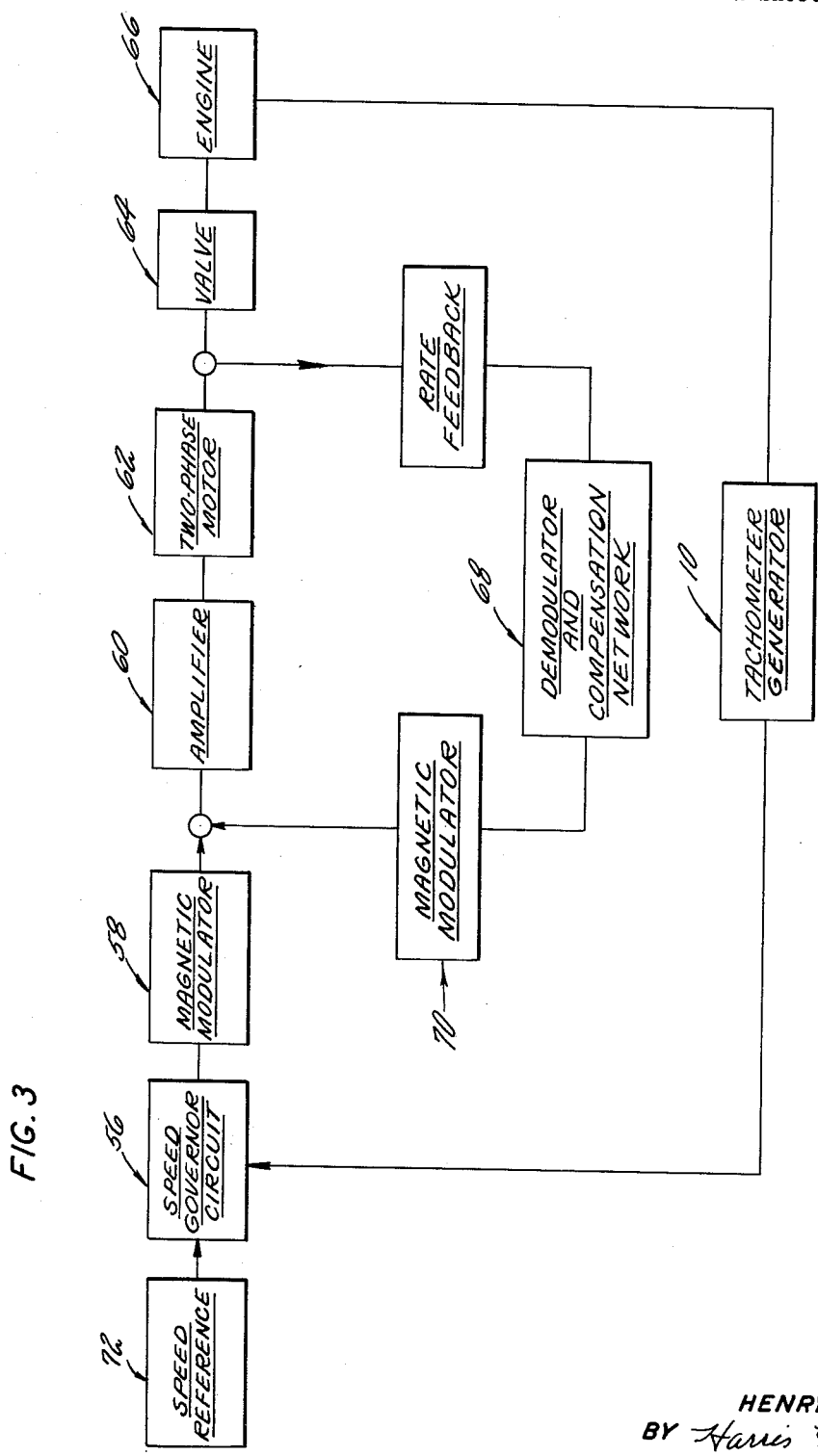
FIG. 3 is a block diagram of a turbine fuel control governor utilizing the electronic control circuit of FIG. 1.

Referring to FIG. 1, a device such as a tachometer generator 10 which is responsive to the speed of a turbine, is utilized to create a three-phase A.C. signal having an amplitude and frequency which varies in direct proportion to the engine speed. The three-phase A.C. signal is fed directly to a full-wave diode rectifier circuit 12 through lines 14, 16 and 18, each of which may be connected to one of the three-phase generator windings. A fixed resistor 20 and a potentiometer 22 are placed in series with rectifier circuit 12 and the full voltage drop of the rectified speed signal will be across resistor 20 and potentiometer 22. Arm 24 is adjustable and will transmit the selected portion of the signal through line 26 to one side of winding 28, illustrated as point A. The D.C. voltage at this point is proportional to the amplitude of the three-phase generator signal, and will vary directly with the speed to be sensed. Winding 28 may, for example, be the signal or input winding of a magnetic modulator.

A single-phase portion of the three-phase generator signal is fed from across lines 14 and 16 to primary winding 30 of step-up transformer 32. The step-up voltage output from secondary winding 34 passes through a frequency responsive circuit comprising series resistor 36 and capacitor 38. The frequency and amplitude of the signal at this point are also proportional to the speed of the engine, so that both the frequency and amplitude of the voltage signal will increase directly with engine speed. Capacitor 38 is chosen so that its reactance will decrease with an increase in frequency in proportion to the increase in amplitude which occurs as the frequency increases, and there will be a constant voltage drop across capacitor 38. A full-wave bridge rectifier 40 is connected across capacitor 38 and the rectified D.C. signal is fed across potentiometer 42. Arm 44 can be adjusted to vary the portion of the D.C. voltage from potentiometer 42. A two-position switch 46 is placed in series with arm 44 and when the switch is in contact with contact point 45, which hereinafter will be referred to as the governing position of the switch, the signal sensed by arm 44 will be transmitted through switch 46, line 47 and resistor 49 to point B of winding 28. A second contact point 48 is connected through line 50 to line 26 and when switch 46 is moved into contact with contact point 48, a short circuit will exist across coil 28, and the signal from arm 44 will be disconnected from point B of coil 28. A capacitor 52 is connected by line 51 from line 47 to common line 54 which joins one side of bridge rectifier 40 with one end of rectifier 12. Line 54 may be grounded.

FIG. 2 illustrates how the signal across winding 28 varies with engine speed and frequency. The voltage at point A varies linearly with engine speed, and will be directly proportional to the speed and thus dependent on the amplitude of the output signal from generator 10. Because of the reactive element 38, the voltage at point B, after an initial increase, becomes relatively constant for all engine speeds in the normal operating range, and thus is independent of frequency and signal amplitude. At one particular engine speed, the voltage at points A and B will be identical, and at this speed there will be no voltage drop across or current flow through winding 28. This point will be in FIG. 2 where lines A and B intersect. If the speed of the engine changes, the voltage at point A will vary linearly in proportion to the change in speed, while the voltage at point B will remain fixed thus creating a voltage drop across winding 28 and a current will now flow, the magnitude and direction being indicative of the amount and direction of speed variation.

The control speed can be varied by adjustment of arms 44 or 24 or both, and this will enable the pilot to select the speed at which no signal will occur across winding 28. A fuller description of the operation of this circuit may be had by referring to application Ser. No. 811,474, filed May 6, 1959, by William Peck for Three-Phase Voltage Responsive Speed Sensor.

When switch 46 is connected with contact point 45, and is thus positioned for governing operation, the direct current signal picked off by arm 44 is applied to point B of winding 28 through line 47 and resistor 49. Capacitor 52 is connected between line 47 and common line 54, and will normally become charged to whatever potential is picked off by arm 44. If a different reference potential is desired at point B, arm 44 can be moved across resistor 42 to vary the voltage picked off by arm 44. Point B will not change instantaneously, since capacitor 52 will attempt to hold the circuit at the potential to which the capacitor is charged, and point B will move gradually to the new value of reference voltage as capacitor 52 is either charged to the higher value or discharged to the lower value of reference potential. The delay involved is a function of the time constant of the circuit, and may be adjusted by varying the size of capacitor 52. When switch 46 is moved into contact with point 48 and thus positioned for standby operation, the reference signal from arm 44 will be disconnected, and the speed signal from arm 24 will have a short circuit path through line 50, switch 46, line 51, and capacitor 52 to common line 54. Capacitor 52, which is originally charged to the potential picked off by arm 44, must now charge to the value of the potential of arm 24, if this potential is different from that of arm 44. As this occurs, point B, which was also at the potential of arm 44, will move slowly towards the new value which is the same as point A. In other words, if points A and B were at the same potentials when switch 46 was moved from governing to standby, no change will take place, but if a difference in potential existed between points A and B, capacitor 52 and point B will move slowly towards the potential of point A. In either case, after a time dependent on the time constant of the circuit, points A and B will be balanced, and there will be no signal across winding 28. Because of the short circuit caused by the switch 46 being in the standby position, points A and B will remain at equal potentials regardless of the speed signal from arm 24.

When the pilot desires to switch into the governing mode of operation, switch 46 is moved into contact with point 45. At this time the speed signal from arm 24 may be above or below the reference signal from arm 44. If these signals were applied instantaneously to points A and B, a large error signal would be created, and the helicopter might be caused to react dangerously. Capacitor 52 will prevent this.

When switch 4 is moved into governing position, capacitor 52 is at the same potential as point A and point B. Assume that the reference signal from arm 44 is at a higher potential than that of point A and capacitor 52. Before the higher potential can reach point B, capacitor 52 must be charged to this higher potential, and since a capacitor will not react instantaneously, a delay results while capacitor 52 charges slowly to the higher potential. Point B will follow the capacitor voltage, and an instantaneous aplication of a large error signal across winding 28 will be avoided. The same action will take place if the reference signal from arm 44 is at a lower potential than point A, except that capacitor 52 must now discharge before point B will reach the potential of arm 44.

It can be seen that the effect of the capacitor is to attenuate the magnitude of the error signal when switching to governing operation. This will allow the system, which it is desired to govern, time to react slowly and will prevent the instantaneous application of a large error signal.

In FIG. 3 the speed governing circuit is shown in connection with an engine fuel control. The governing circuit of FIG. 1 is shown as block 56. The error signal from the speed governing circuit is changed from D.C. to A.C. by magnetic modulator 58. The ouput from the modulator is amplified as necessary through amplifier 60, and the error signal will cause the two-phase motor 62 to move valve 64 in accordance with the magnitude and direction of the error signal. Valve 64 will control the flow of fuel to engine 66 and thus will regulate the speed of the engine. A rate feedback from motor 62 is demodulated and compensated as necessary for the system operation in 68, and converted back to A.C. through an additional magnetic modulator 70. The engine speed is sensed by tachometer generator 10 and fed to speed governing circuit 56. A speed reference 72 which is incorporated in the speed governing circuit of FIG. 1, but may be an outside reference signal, is fed to the speed governing circuit 56. The engine speed as sensed by generator 10, when compared with the reference signal, will thus, through the system described, control the fuel flow and hence the speed of engine 66.

Although this invention has been described with a certain degree of particularity, it is understood that the present disclosure has been made only by way of example and that numerous changes in the details of construction and the combination and arrangement of parts may be resorted to without departing from the spirit and scope of the invention as hereinafter claimed.

I claim:

1. In combination, means for producing a signal proportional to the actual speed of a rotating element, means for producing a datum signal proportional to the desired speed of said rotating element, means for comparing said speed signal with said datum signal and producing an error signal, and means for selectively disabling and reactivating said error signal producing means including means for temporarily attenuating the magnitude of said error signal upon reactivation of said error signal producing means.

2. A circuit for producing an error signal proportional to the deviation of the speed of an engine from a preselected value comprising means for providing an A.C. signal proportional to actual engine speed, means including a rectifier for converting said A.C. signal into a D.C. speed signal, means including a rectifier and a frequency variable reactance acting on said A.C. signal and producing a constant D.C. datum signal, means for sensing a selectable portion of said speed signal, means for sensing a selectable portion of said datum signal, means including a coil connected with both said sensing means for comparing said datum signal and said speed signal and producing an error signal, switch means in the connection between said datum signal sensing means and said coil for selectively disconnecting and reconnecting said datum signal with said comparing means, means connecting said speed signal sensing means with said switch means when said datum signal is disconnected for providing a short circuit across said coil and disabling said comparison means, and signal storage means connected to receive the signal flowing through said switch means and to prevent rapid changes in said error signal upon reconnection and changes in said datum signal.

3. In a condition control system, control means, datum signal means, and condition responsive means connected in series, storage means connected across said datum signal means, switch means disconnecting said datum signal means from said control means and said storage means and connecting said storage means across said condition responsive means.

4. In a speed control system, control means comprising a signal receiving coil, means providing a reference voltage and means providing a speed responsive voltage, said three means being connected in series to compare said two voltages and supply an error signal to said coil, a capacitor connected across said reference voltage means, and switch means normally completing said series connection by connecting said reference voltage with said coil and completing the connection of said capacitor across said reference voltage, said switch means being movable to disconnect said reference voltage means from said coil and said capacitor and connect said capacitor across said speed responsive voltage means thereby disabling said coil.

5. Means preventing rapid changes in a control system when changing from a standby to a controlled condition, comprising means creating a reference signal, means creating a condition responsive signal, and means comparing said signals and responsive to a difference in said signals for changing said condition and said condition responsive signal, storage means connected across said condition responsive signal means during standby, and connected across said reference signal means upon change from a standby to a controlled condition.

6. In a speed control system for an engine, a generator for providing a signal proportional to actual engine speed, circuit means acting upon said generator signal producing a constant datum signal, means for comparing said speed signal and said datum signal to produce an error signal, a switch for selectively disconnecting said datum signal from said comparing means to thereby disable said comparing means, and a capacitor connected with said switch and responsive to the signal therethrough for temporarily attenuating the magnitude of said error signal upon reconnecting said datum signal with said comparing means.

7. A speed control system as in claim 6 in which said capacitor will also temporarily retard the change in said error signal produced by variations of said datum signal.

8. In a speed control system for an engine, a generator providing a signal proportional to actual engine speed, circuit means acting upon said generator signal to produce a constant datum signal, means for comparing said speed signal and said datum signal to produce an error signal, a switch connecting said datum signal with said comparing means, said switch being operable to disconnect said datum signal from said comparing means and thereby disable said comparing means, means connecting said speed signal with said switch when said datum signal is disconnected, and a capacitor responsive to the signal through said switch, said capacitor preventing rapid changes in said error signal upon reconnecting said datum signal with said comparing means.

References Cited in the file of this patent

UNITED STATES PATENTS

| | | |
|---|---|---|
| 2,492,472 | Fortescue | Dec. 27, 1949 |
| 2,510,296 | Root | June 6, 1950 |
| 2,668,921 | Lash | Feb. 9, 1954 |
| 2,684,479 | Hill et al. | July 20, 1954 |
| 2,754,921 | Dinsmore | July 17, 1956 |
| 2,772,378 | Farkas | Nov. 27, 1956 |
| 2,775,724 | Clark | Dec. 25, 1956 |
| 2,827,910 | Wells | Mar. 25, 1958 |
| 2,829,662 | Carey | Apr. 8, 1958 |
| 2,888,067 | Kuzmitz | May 26, 1959 |
| 2,958,038 | Kwast | Oct. 25, 1960 |